(12) United States Patent
Stol et al.

(10) Patent No.: US 6,828,526 B1
(45) Date of Patent: Dec. 7, 2004

(54) GAS METAL BURIED ARC WELDING OF LAP-PENETRATION JOINTS

(75) Inventors: Israel Stol, Pittsburgh, PA (US); Kyle L. Williams, Shelocta, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/438,675

(22) Filed: May 15, 2003

(51) Int. Cl.$^7$ .............................................. B23K 9/173
(52) U.S. Cl. .................................. 219/137 R; 219/127
(58) Field of Search ............................. 219/137 R, 127

(56) References Cited

U.S. PATENT DOCUMENTS

| | | | | |
|---|---|---|---|---|
| 1,615,686 | A | * 1/1927 | Eschholz | 219/137 R |
| 2,892,925 | A | * 6/1959 | Butterfield et al. | 219/127 |
| 4,037,078 | A | 7/1977 | Oishi et al. | 219/137 |
| 4,038,514 | A | 7/1977 | Ashton | 219/126 |
| 4,074,105 | A | 2/1978 | Minehisa et al. | 219/137.8 |
| 4,095,085 | A | 6/1978 | Tomita et al. | 219/123 |
| 4,292,496 | A | 9/1981 | Hoy et al. | 219/126 |
| 4,463,243 | A | 7/1984 | Church | 219/74 |
| 4,912,299 | A | 3/1990 | Oros et al. | 219/137 |
| 5,495,091 | A | 2/1996 | Tabata et al. | 219/130.51 |
| 5,672,286 | A | 9/1997 | Seeds | 219/137 |
| 6,274,845 | B1 | 8/2001 | Stava et al. | 219/125.12 |
| 2003/0136768 | A1 | * 7/2003 | Sonoda et al. | 219/121.64 |
| 2004/0000539 | A1 | * 1/2004 | Takikawa et al. | 219/121.64 |

* cited by examiner

*Primary Examiner*—Clifford C. Shaw

(57) ABSTRACT

A method of welding continuous or intermittent lap-penetration joints using a gas metal buried arc (GMBA) welding process. A first component is GMBA welded to an underlying second metal component, by forming an arc between a consumable metal electrode and a surface of the first component, depositing metal from the electrode to the first component and producing a pool of molten metal which extends through the first component and into the second component. The molten pool metal solidifies into a weld that extends into the second component wherein the weld width at the interface between the components is at least equal to the thickness of the thinner of the first component and the second component. The arc is at least partially buried within the thickness of the first component and is moved in the direction of the desired joint location to produce a joint.

9 Claims, 3 Drawing Sheets

GAS METAL BURIED ARC WELDING OF LAP-PENETRATION JOINTS

FIELD OF THE INVENTION

The present invention relates to welding of lap-penetration joints, more particularly to gas metal buried arc welding of lap-penetration joints.

BACKGROUND OF THE INVENTION

Gas metal arc (GMA) welding of metal components involves application of current to a consumable metal electrode in a torch and forming an arc between the tip of the electrode and a surface of the components. The metal of the electrode deposits as a filler material onto the components, and a molten pool of metal forms that includes a mixture of the metals of the electrode and of the component. A weld joint forms upon solidification of the molten metal. GMA welding is generally used for joining relatively thin (1 mm–4.5 mm) components in arrangements such as lap-fillet, tee-fillet and square butt joints. FIG. 1 is a schematic of GMA welding of a square butt joint between two components 2, 4 in which an arc 6 is produced from a metal electrode 8. A pool of molten metal 10 forms between the electrode 8 and components 2, 4 to produce a weld bead 12 which solidifies behind the moving weld region of the arc 6 and molten pool 10. These joints (lap-fillet, tee-fillet and square butt) require that the tip 14 of the electrode and the arc are laterally placed within ±0.5 mm of the joint edge being welded. While use of robotics and fixturing provides control over the welding operation, several techniques have been used to ensure that the lateral placement of the electrode arc is correct relative to the joint.

One solution is to use dimensionally accurate components and welding fixtures, which adds significant costs to the final cost of the process. Alternatively or in addition, the torch and arc may be oscillated relative to the joint edges to compensate for variations in the edges or the edge locations due to variations in dimensional tolerances of parts, welding fixtures and/or positioners as well as variations in the lateral placement of the electrode tip and arc relative to the joints. While torch oscillation overcomes greater variability in the joint edges, a major drawback is a significant reduction in productivity, i.e. the welding speed of travel is reduced to allow for oscillation to occur. Other methods of improving the joint/electrode relationship employ vision based seam-tracking systems, most of which are expensive, unreliable with aluminum components and maintenance intensive. Tactile seam tracking systems are effective, but have limited applicability to welding three-dimensional assemblies such as sharp corners or in accommodating changes in direction or creating several short joints.

Moreover, conventional practice teaches that lap-penetration joints are not suitable for GMA welding because the weld (from the molten metal pool 10) does not reach sufficient depths in the component stack to melt and fuse the lower component with the weld upon solidification, i.e. does not penetrate into the lower component. Although, spot welding of lap-penetration joints with the GMA welding has been known for many years, its uses have been limited to structurally non-critical joints for the several reasons. The combination of short welding time, insufficient current density applied during spot welding and inability to cathodically clean the surface oxides, present on the faying surfaces between the overlapping parts, have resulted in "wine-cup" shaped profiles of spot welds with limited weld penetration into the lower component and insufficient interfacial weld width. This makes GMA welded spot welds relatively weak and of limited endurance under fatigue type loading.

Deeper GMA welding, referred to as gas metal buried arc (GMBA) welding, has been accomplished with square butt joints as shown in FIG. 2. The GMBA welding process differs from conventional GMA welding in that (1) the welding current passed through the welding electrode is significantly higher with the GMBA welding process than with conventional GMA welding. This results in higher current densities in the GMBA welding process, which leads to a more penetrating collimated are arc that penetrates deeper into the components 2, 4. However, deep GMBA welding of law penetration joints has not heretofore been accomplished.

SUMMARY OF THE INVENTION

The present invention includes a method of making a lap-penetration joint comprising gas metal arc welding a first metal component to an underlying second metal component by forming an arc between a consumable metal electrode and a surface of the first component, depositing metal from the electrode to the first component and producing a pool of molten metal which extends through the first component and into the second component. Upon solidification of the molten pool metal into a weld, the width of the weld at the interface between the two components is at least equal to the thickness of the thinner of the first component and the second component. During welding, the arc is at least partially buried within the thickness of the first component and is moved in the direction of the desired joint location to produce a joint.

DETAILED DESCRIPTION OF PREFERRED EMBODIMENTS

Figure 1:
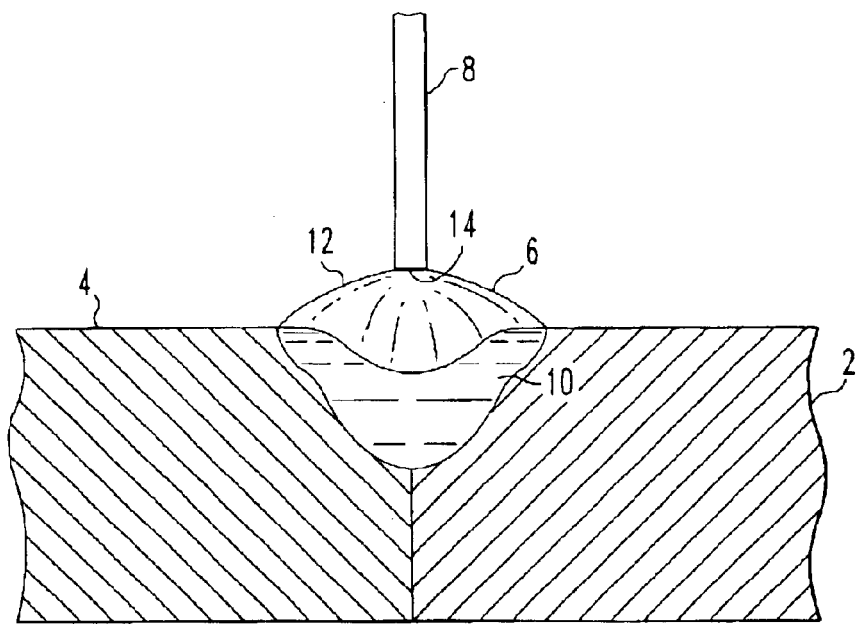
FIG. 1 is schematic of prior art gas metal arc welding of a square butt joint.
Figure 2:
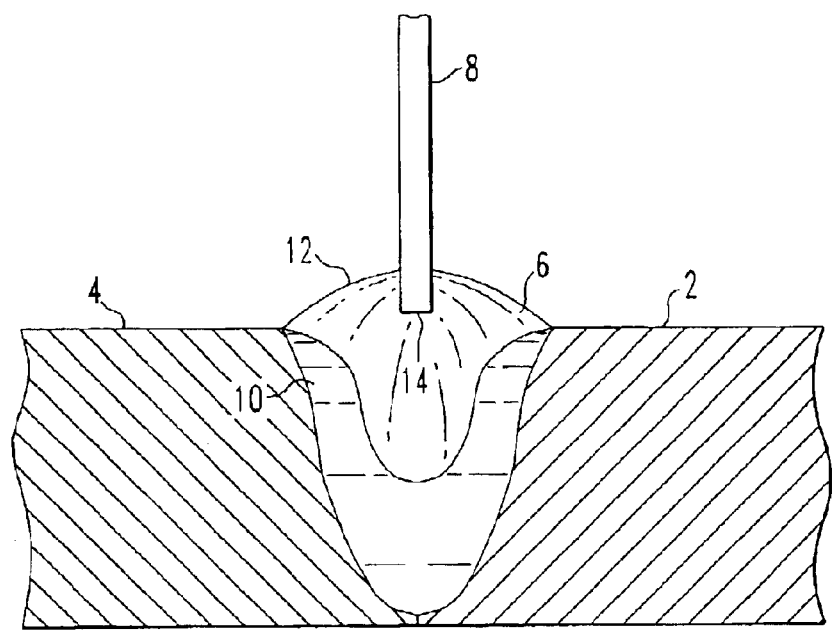
FIG. 2 is schematic of prior art gas metal buried arc welding of a square butt joint.

For purposes of the description hereinafter, the terms "upper", "lower", "right", "left", "vertical", "horizontal", "top", "bottom " and derivatives thereof relate to the invention, as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 3:
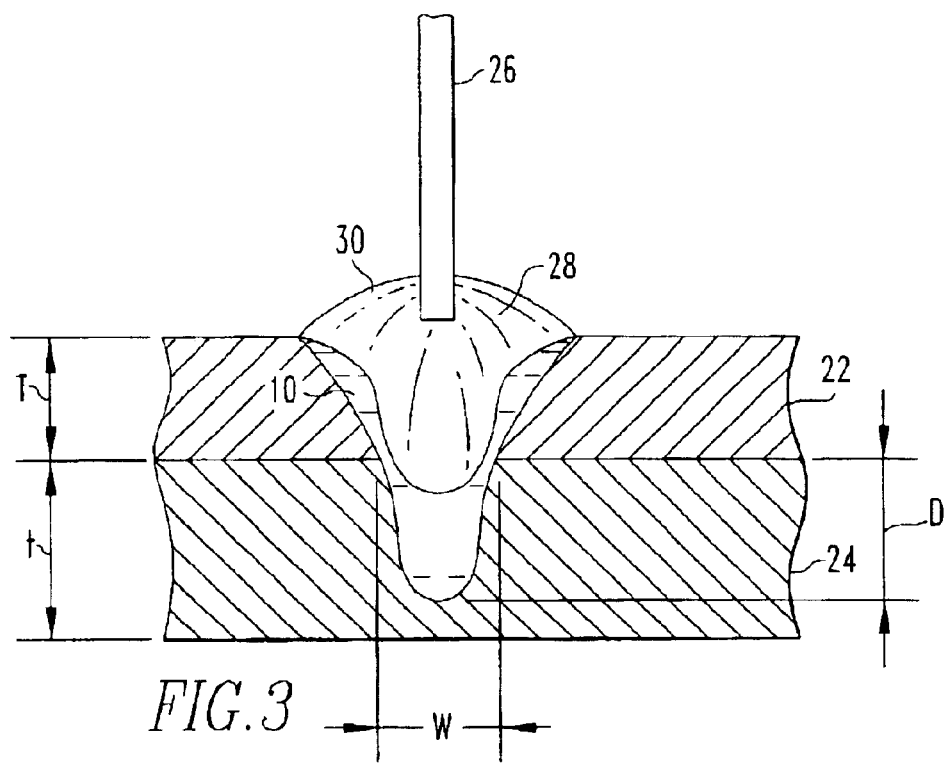
FIG. 3 is a side view of welding of a lap-penetration joint according to the method of the present invention.

The present invention includes a method of GMBA welding of lap-penetration joints. To overcome the aforementioned limitations of GMA welding lap-penetration joints (i.e. inability to cathodically clean surface oxides from the faying surfaces, limited penetration and insufficient interfacial width), lap-penetration joints are welded with high power density processes (e.g., laser beam, electron beam or plasma welding). Referring to FIG. 3, a first metal component 22 is positioned against a second metal component 24. The first and second components 22, 24 may be in a vertical stack as shown or in other arrangements. High current (e.g. 350 amperes compared to 150 amperes for conventional GMA welding) is delivered to a welding torch having a metal consumable electrode 26 to produce a highly penetrating collimated arc 28 which melts the first and second components 22, 24. The metal of the electrode 26 also melts in combination with components 22, 24 to produce a molten pool which develops into a weld bead 30 upon solidification. The arc 28 penetrates through the first component 22 and upper portion of the second component 24 and melts therethrough to produce a weld between the two components 22, 24. The high current density supported by arc 28 has several effects including providing sufficient electromagnetic force and heat to pierce through, fragment and melt the oxide layers present at the faying surfaces between components 22 and 24; penetrating through the parts stackup; and vigorously agitating the molten pool as it solidifies. In this manner, GMBA welding of lap-penetration joints compensates for the absence of cathodic arc cleaning action of the interfacial surface oxides, (by fragmentation, dissolution and floatation to the welds' top in the form of slag), while achieving at the same time the desired weld geometry (i.e. penetration and interfacial width).

Figure 4:
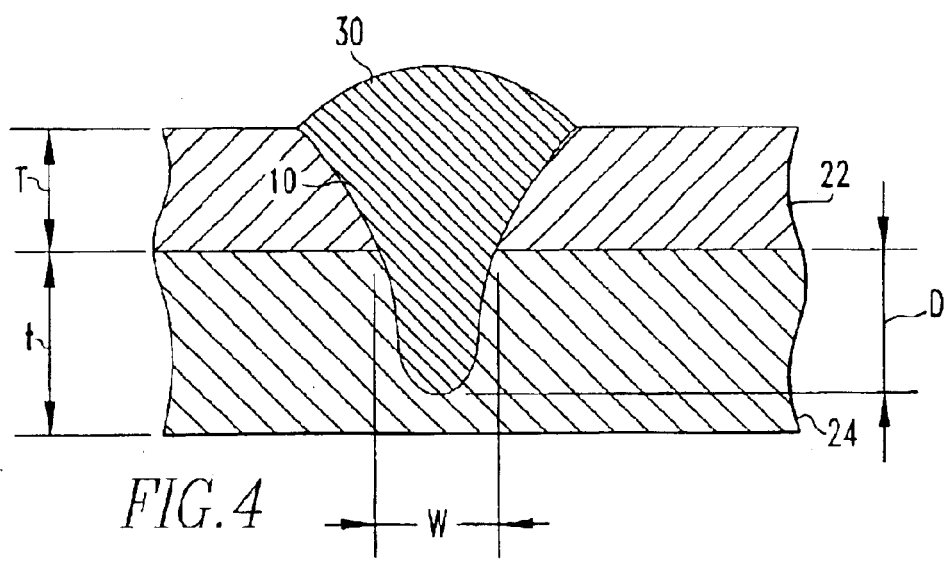
FIG. 4 is a side view of the joint produced in FIG. 3.

Referring to FIG. 4, the weld 30 is produced under process conditions to ensure that the width and depth of the weld 30 are sufficient to successfully create a lap-penetration joint. To this end, the depth D of penetration of the weld into the second component 24 should be sufficient to melt the second component 24 and fuse and/or coalesce with the weld upon solidification. With relatively thin (1–5 mm) components, 5–10% penetration into the second component 24 is adequate. In addition, the weld width W of at the interface between the first and second components 22, 24 should be at least as great as the thickness T or t of the thinner of the respective components 22, 24. In FIG. 4, the component 24 is depicted as the thicker component, but this is not meant to be limiting as the components 22, 24 may be of equal thickness or the component 22 may be thinner than component 24. The electrode and arc are moved in the direction of a desired location of the joint between the first and second components 22, 24. Welding may be performed continuously or intermittently to create a stitch weld.

Suitable materials for lap-penetration welding according to the present invention are components of aluminum alloys of the Aluminum Association (AA) using AA alloys as the electrode. Both of the components may be sheet products, castings or extrusions and combinations thereof. By way of example, the present invention has been used to successfully weld together two 2 mm thick AA 5754-O sheets using an AA 5356 electrode at 300 amps and to join a 2 mm thick AA 6022-T4 sheet to a 4 mm thick AA 7005-T6 extrusion. The present invention of GMBA welding is also suitable for producing lap-penetration joints between components made from other materials such as steel, stainless steel, titanium and alloys of titanium and copper and alloys of copper.

Lap-penetration joints produced according to the present invention may be produced with greater efficiency than GMA welding of other joints such as lap-fillet joints which require slower welding speeds of travel and/or torch oscillation to accommodate lateral variations in electrode tip/arc position relative to the joint edges. While the typical speed of travel for GMA welding lap-fillet joints ranges is about 0.6 to 1.2 meters/minute for welding 2.5 mm thick parts, GMBA welding of comparably thick lap-penetration joints according to the present invention is about 1.5 to 2 meters/minute. In addition, the present invention avoids the need for strict dimensional tolerances of parts and simplification in the assembly procedure (i.e., fixturing and weld sequencing) because the lateral placement of the electrode tip/arc relative to the parts edges with lap-penetration joints is less critical as with other joints. Another advantage of GMBA welding of lap-penetration joints is that the same welding equipment can be used for both GMBA and GMA welding which maximizes the utilization of such welding systems and avoids the costly welding systems previously used for lap-penetration joints of laser beam, electron beam and plasma welding. This would be attained through switching between the two welding modes when welding different joints (i.e., lap-penetration versus lap-fillet, tee-fillet, etc.) on the same or different assemblies. In addition, the higher speeds of travel with GMBA welding of lap-penetration joints reduces the overall weld-induced distortion from that which occurs during GMA welding of lap-fillet joints between parts of comparable thickness.

Figure 5:
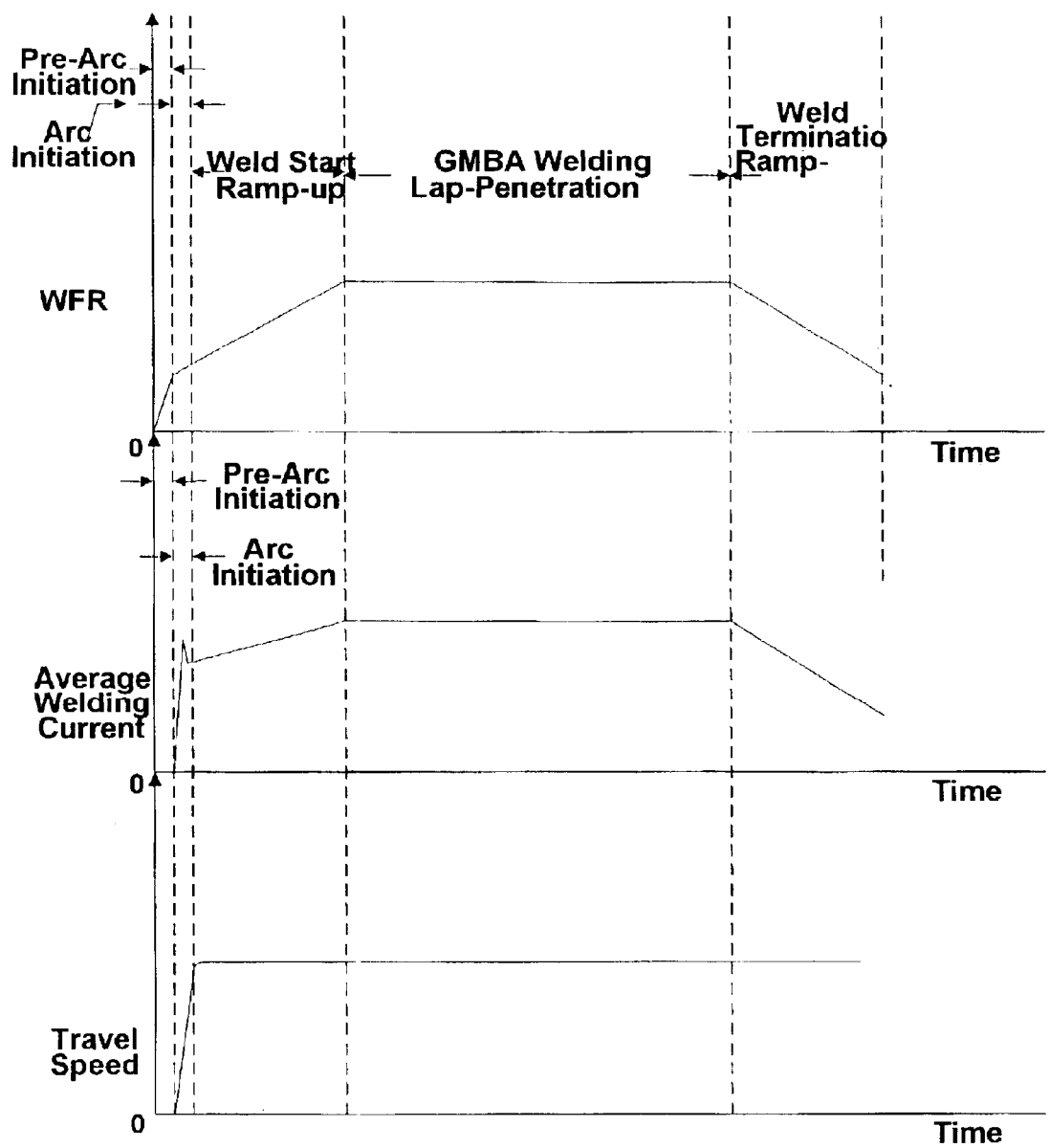
FIG. 5 is a graph of proposed synchronization of electrode feed rate, welding current and travel speed for practicing the present invention.

Depending on the application, the GMBA welded lap-penetration joints may be produced using DC current with electrode positive (reverse) polarity or electrode negative (straight) polarity. The invention can also be practiced with other pulsed and non-pulsed (e.g., square wave, AC) current and/or wire feeding modulating systems. To achieve controlled weld starts and stops (i.e., with consistently sound quality and geometric attributes) during GMBA welding lap-penetration joints, welding systems with programmable weld start and termination routines may be employed. The electrode feed rate (or wire feed rate, WFR) is synchronized with welding current, may be programmed to ramp-up and ramp-down as a function of different thickness and alloy combinations as shown in FIG. 5. In some instances, the weld start and termination routines may be programmed to synchronize the electrode feed rate/welding current and welding speed of travel.

Having described the presently preferred embodiments, it is to be understood that the invention may be otherwise embodied within the scope of the appended claims.

What is claimed is:

1. A method of gas metal buried arc welding a lap-penetration joint between a first metal component and an underlying second metal component comprising the steps of:

forming an arc between a consumable metal electrode and a surface of a first component;

depositing metal from the electrode to the first component and producing a pool of molten metal which extends through the first component and into an underlying second component;

solidifying the molten metal pool into a weld, wherein the width of the weld at an interface between the first component and the second component is greater than or equal to the thickness of the thinner of the first component and the second component; and moving the arc and electrode in across a surface of the first component to produce a joint.

2. The method of claim 1, wherein the weld penetrates into the second component and fuses with the second component upon solidification.

3. The method of claim 1, wherein the arc is at least partially located within the thickness of the first component.

4. The method of claim 1, wherein the first and second components are aluminum alloys.

5. The method of claim 4, wherein the first component and the second components are each selected from the group consisting of a sheet product, a casting, an extrusion or a forging.

6. The method of claim 1, wherein the first and second components are made from the materials selected from the group consisting of steel, stainless steel, titanium alloys thereof.

7. The method of claim 1 wherein the arc and electrode are moved at a rate of at least about 1 meter per minute.

8. The method of claim 1 wherein the welding is continuous.

9. The method of claim 1 wherein the welding is intermittent.

* * * * *

UNITED STATES PATENT AND TRADEMARK OFFICE
CERTIFICATE OF CORRECTION

| | | |
|---|---|---|
| PATENT NO. | : 6,828,526 B1 | Page 1 of 1 |
| APPLICATION NO. | : 10/438675 | |
| DATED | : December 7, 2004 | |
| INVENTOR(S) | : Israel Stol et al. | |

It is certified that error appears in the above-identified patent and that said Letters Patent is hereby corrected as shown below:

Column 5, application. The order of Claims 5 and 6 are reversed as presented in patent Lines 5-8

Issued Claim 6 (which is claim 5 from the allowed application) should read:

The method of claim 1, wherein the first and second components are made from materials selected from the group consisting of steel, stainless steel, titanium and alloys thereof and copper and alloys thereof.

The phrase, "and copper and alloys thereof" was also omitted from the above claim when typed by the Patent Office.

Lines 1-4

Present Claim 5 (which is claim 6 from the allowed application) reads fine except for the numbering. It stays as:

The method of claim 4, wherein the first component and second components are each selected from the group consisting of a sheet product, a casting, an extrusion or a forging.

Signed and Sealed this

Second Day of October, 2007

JON W. DUDAS
*Director of the United States Patent and Trademark Office*